J. GALAN.
MOLDING APPARATUS FOR BUILDINGS.
APPLICATION FILED MAR. 4, 1919.
1,313,630.
Patented Aug. 19, 1919.
3 SHEETS—SHEET 3.
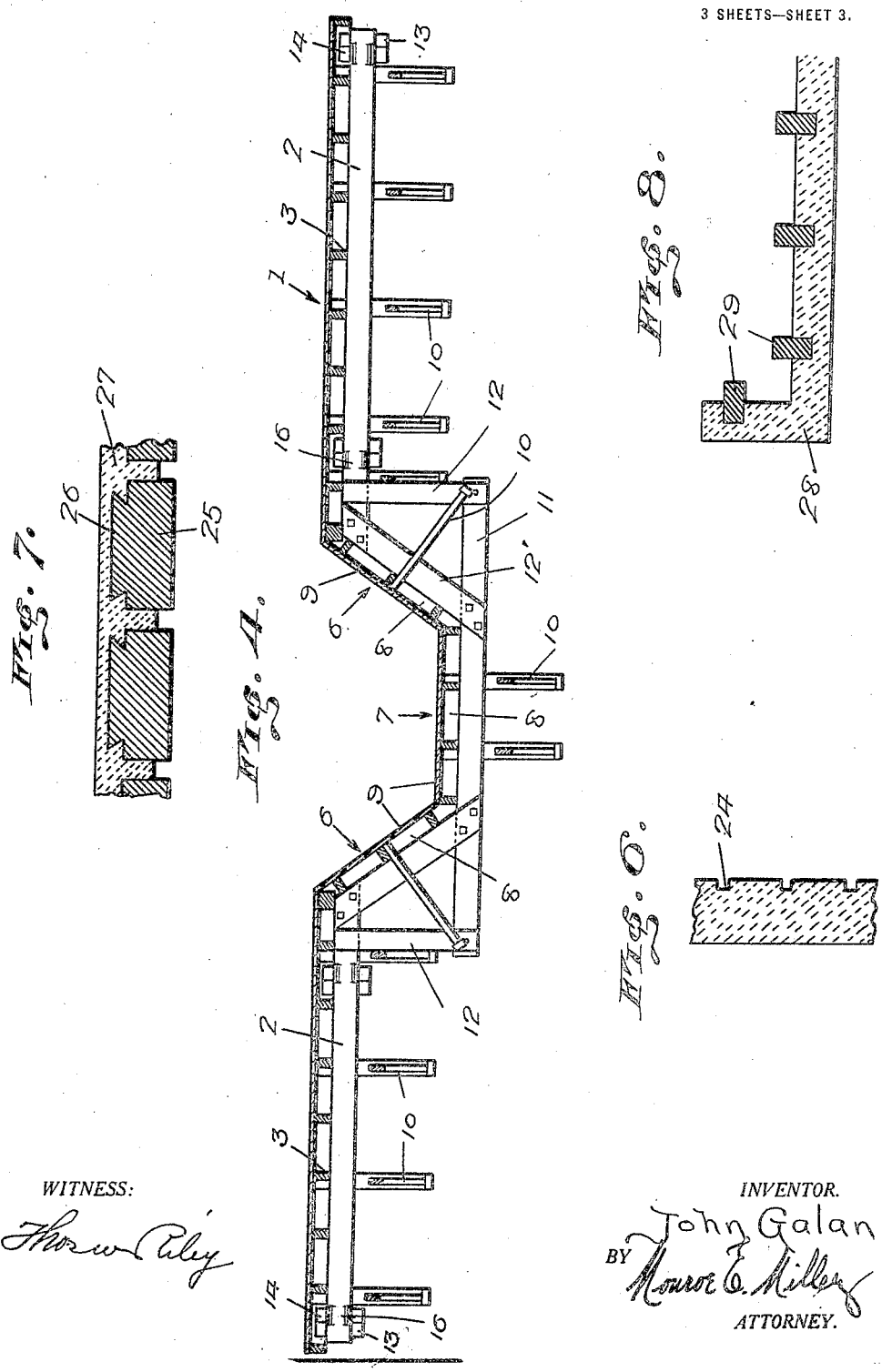
WITNESS:
INVENTOR.
John Galan
BY
ATTORNEY.

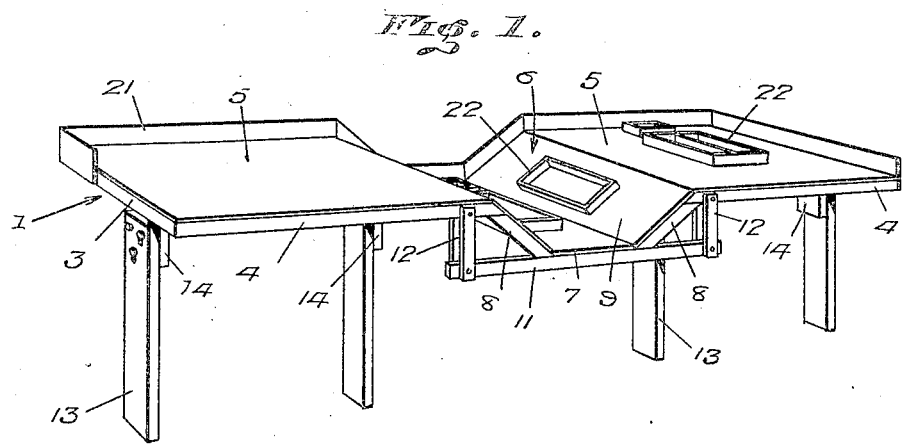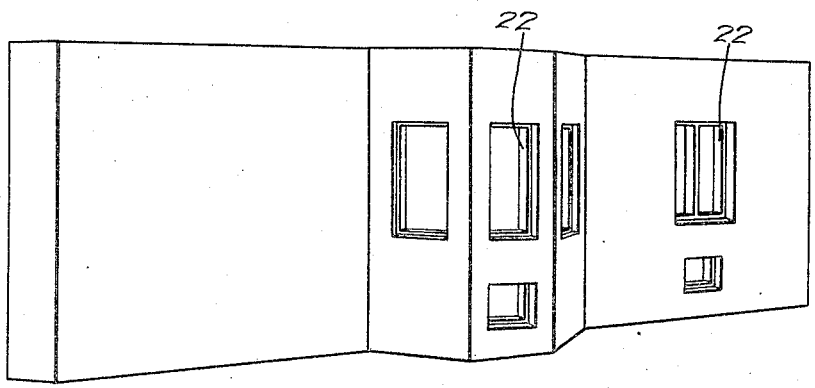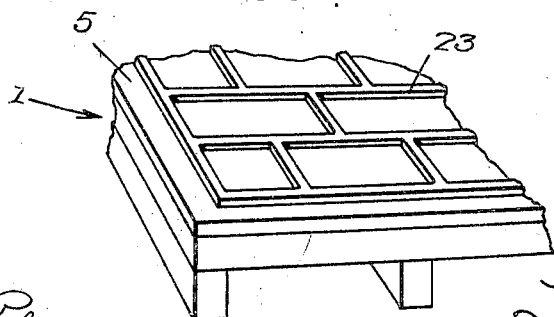

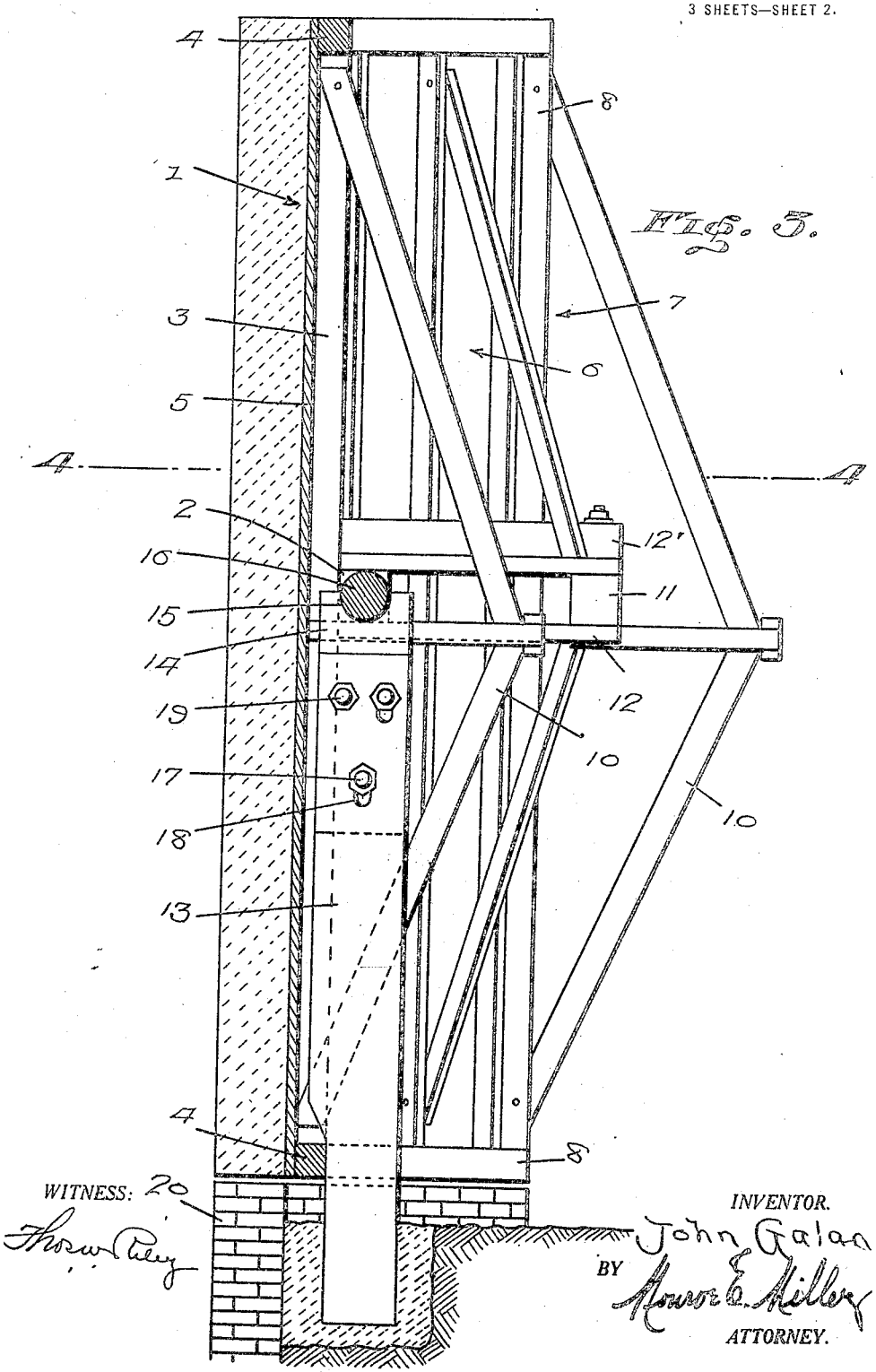

UNITED STATES PATENT OFFICE.

JOHN GALAN, OF ELMHURST, NEW YORK.

MOLDING APPARATUS FOR BUILDINGS.

1,313,630.  Specification of Letters Patent.  Patented Aug. 19, 1919.

Application filed March 4, 1919. Serial No. 280,822.

*To all whom it may concern:*

Be it known that I, JOHN GALAN, a citizen of the United States, and resident of Elmhurst, Long Island, New York, have invented certain new and useful Improvements in Molding Apparatus for Buildings, of which the following is a specification.

The present invention relates to an apparatus for molding the walls of buildings, and aims to provide novel and improved means whereby the walls of a building can be quickly and conveniently molded and then brought into position on the foundation.

The object of the invention is the provision of such an apparatus so constructed that one entire wall, or a section thereof, can be conveniently molded and formed in a horizontal position above the foundation, and then after the grout or concrete has set, the completed wall can be tilted to vertical position and set on the foundation, thus enabling the work to be done quickly, and eliminating the use of built up vertical molds commonly used into which concrete is poured, and which require considerable work and material.

A further object is to provide such an apparatus which will enable the window and door frames to be a part of the mold and to be made fast in the concrete as it sets, so that the wall when moved into position will be complete with the windows and doors.

Another object of the invention is to enable the apparatus to be built for forming alcoves and other irregular portions of the wall, and to make the wall of different sizes and shapes.

The invention also has for a further object the construction of such an apparatus which will withstand the heavy load imposed thereon during the molding of the wall, and which will permit the wall to be easily tilted to vertical position after the grout has hardened.

With the foregoing and other objects in view which will be apparent as the description proceeds, the invention resides in the construction and arrangement of parts hereinafter described and claimed, it being understood that changes can be within the scope of what is claimed without departing from the spirit of the invention.

The invention is illustrated in the accompanying drawings, wherein:—

Figure 1 is a perspective view of the apparatus, portions being broken away.

Fig. 2 is a perspective view of a wall molded by said apparatus.

Fig. 3 is an enlarged vertical section of the apparatus showing the platform tilted to vertical position to set the wall on the foundation.

Fig. 4 is a longitudinal section taken on the line 4—4 of Fig. 3 on a reduced scale.

Fig. 5 is a perspective view showing means used on the platform to provide a brick or grooved finish on the exterior of the wall.

Fig. 6 is a sectional detail of a wall as formed by the means shown in Fig. 5.

Fig. 7 is a sectional detail of another form of wall showing how bricks can be used.

Fig. 8 is a sectional view of still another form of wall, showing the use of studs embedded in the concrete.

In carrying out the invention, there is provided a molding platform 1 which is in horizontal position during the molding operation, and which is mounted for rocking movement about a longitudinal horizontal axis in order that the wall can be swung to vertical position after the grout has set. This platform can be adjusted to different sizes and shapes, according to the wall it is desired to mold, and the platform is of knock-down sectional construction, in order that it can be taken apart and assembled to produce different sizes and styles of walls. As shown, the platform has two main flat portions between which is located an alcove portion or section.

The frame work or construction of the platform includes a longitudinal median axle of timber of suitable size, and the axle as shown constitutes two spaced alining sections 2. Each section of the platform also includes transverse beams or joists 3 secured between their ends on one section of the axle, and bars 4 are secured to the ends of the beams 3, to comprise a frame, on which is secured the flooring or top 5 which can be of sheet material, boards laid edge to edge, or the like.

In order to form an alcove, as shown in Fig. 2, alcove sections 6 and 7 are used, the sections 6 extending angularly from the adjacent ends of the main sections and the section 7 being disposed between the sections 6 in a plane parallel to the plane of the main platform. The sections 6 and 7 have frames 8 similar in construction to the frames of the main sections, and on which the floorings or tops 9 are secured, and the sections are constructed so as to fit together. Thus, the tops 9 of the sections 6 overlap the adjacent ends of the frames of the main sections, with the frames 8 extending under said frames as seen in Figs. 1 and 4. By thus using different sections of the platform, they can be arranged and assembled to produce walls of different shapes.

Each section of the platform is trussed underneath the same, by means of the transverse trusses 10, in order to support the edge portions of the platform from the axle, and to prevent sagging during the molding operation.

When the alcove sections are used, means is provided for supporting same from the axle sections 2 between which the alcove sections are located. Thus, longitudinal beams 11 extend underneath the frame 8 thereof, and hangers 12 suspend the ends of the beams 11 from the axle sections 2 and the bars 4. The beams 11 can also be connected by braces 12' to the axle sections and bars, to make the cradle rigid, which supports the alcove sections, it being noted that this cradle, which is hung or suspended between the axle sections and main sections of the platform, supports the sections 6 and 7 to prevent sagging thereof.

The means for supporting the platform for rocking or tilting movement embodies a suitable number of posts 13, which have pieces 14 at their upper ends provided with seats 15 in which rounded or cylindrical portions 16 and the axle are seated. The pieces 14 are secured to the posts 13 by means of bolts 17 disposed in slots 18, and said bolts are tightened to clamp the parts together. In order to prevent premature sliding of the pieces 14, screws or bolts 19 are provided. These will not let the pieces 14 shift down unless said screws are removed first, and the bolts 17 then loosened. This arrangement is provided in order that there will be a slight clearance between the foundation 20 and the wall when the mold is swung to vertical position as seen in Fig. 3, after which the pieces 14 can be loosened to permit the mold to shift and permit the wall to settle on the foundation, it being preferable to place a layer of mortar on the foundation on which the wall will be made firm.

In using the apparatus, the posts 13 are planted in the ground adjacent to the foundation 20 on the outside thereof, and the platform is supported in a horizontal position overhanging the foundation. Suitable props (not shown) are placed underneath the opposite wings of the platform to support the same and prevent the platform from tilting during the molding operation. Boards 21 are then secured to the margin of the platform and project upwardly to provide flanges retaining the grout or concrete on the platform. The window and door frames 22 are then placed in position on the platform, as seen in Fig. 1, and the grout is poured on the platform to surround said frames, and is worked to the desired thickness of the wall and formation. The concrete is then allowed to set, and after this occurs the props are knocked out from under the platform, and the platform tilted and swung to a vertical position, thus moving the completed wall into upright position over the foundation, the boards or sides 21 of the molding having been previously removed. Then by loosening the pieces 14, the wall is lowered on the foundation. The mold can then be taken down and moved to another side of the building, and the sections of the mold can be rearranged and reassembled at the various sides of the building, until the same is completed. The platform can also be elevated for making and depositing wall sections one on the other. It will be noted that the concrete in being poured around the window and door frames will provide the desired door and window openings, and the frames will be embedded in the concrete so as to be a part of the wall, as seen in Fig. 2.

With the construction herein described, the exterior surface of the wall can be finished in different ways, it being noted that the platform is used to form the exterior surface of the wall. Thus, by scattering gravel or pebbles over the platform before the concrete is poured, this will give a pebble dash finish, and in the same way, other materials can be placed on the platform to give different finishes. As shown in Fig. 5, strips 23 can be placed on the platform to provide blocks or rectangles in the form of brick work, so that when the concrete is poured over said strips, this will provide grooves 24 in the exterior surface, as seen in Fig. 6, in order that the wall will have the appearance of being built of bricks or blocks. Furthermore, bricks, cut stone or terracotta tiles can be disposed between the strips 23, and said strips varied according to design, and concrete poured over them and allowed to set, thus producing a wall as shown in Fig. 7, with the anchor portions 26 of the bricks locked within the concrete 27 and thus providing a brick wall of ornate appearance and substantial construction. As shown in Fig. 8, studs with a thin coating of concrete, and laths can be nailed to said studs in the manner of an ordinary frame building. Fig. 8 also illustrates how the wall can be molded with an angle or corner portion at one or both ends. The apparatus thus affords convenient and effective means for giving the wall the desired finish, as well as enabling the construction of the wall to be of various styles. It is also possible to mold the entire wall at one operation and then move it into place, thus saving time and labor as well as material, as compared with the method now used of building wall molds and pouring the grout into same.

Having thus described the invention, what is claimed as new is:—

1. An apparatus for molding walls, embodying a molding platform comprising sections, each section including a horizontal axle section, a frame on the axle section, and a top on the frame, means for supporting each axle section for rotation in a common horizontal axis, and means for connecting said frames of the sections to unite the same.

2. An apparatus for molding walls, embodying a molding platform having spaced sections mounted for turning movement on a horizontal axis, angular frame work connecting said sections, and other platform sections supported by said frame work in a desired angular relation with respect to the platform.

3. An apparatus for molding walls, comprising a platform having spaced sections mounted for turning movement on a horizontal axis, and an offset frame portion secured to and connecting said platform sections.

4. An apparatus for molding walls comprising a platform having sections mounted for turning movement on a horizontal axis, an offset portion connecting said sections, and other platform sections supported by said offset portion at an angle to and offset from the aforesaid platform sections.

5. An apparatus for molding walls embodying spaced alining sections, platform sections supported thereon, a cradle connected to and located between said axle sections and platform sections, and platform sections supported by and located within the cradle to form an alcove.

6. An apparatus for molding walls comprising spaced and alining sections, platform sections thereon, hangers depending from said axle and platform sections, beams supported by said hangers and forming a cradle therewith, and platform sections supported by said beams within the cradle and fitting one another and the aforesaid platform sections.

7. An apparatus for molding walls comprising a molding platform mounted for turning movement from a horizontal to a vertical position, removable upstanding flanges along the margin of the platform for retaining the grout thereon to form a wall, and frames seated removably on the platform around which the grout is worked so as to leave openings in the wall and to separate from the platform and embed the frames in the wall.

In witness whereof I hereunto set my hand.

JOHN GALAN.